United States Patent
Morini

(10) Patent No.: US 8,555,821 B2
(45) Date of Patent: Oct. 15, 2013

(54) HEAT EXCHANGER FOR A BOILER

(75) Inventor: Mario Morini, Broni (IT)

(73) Assignee: Unical AG S.p.A., Castel d'Ario (IT)

(*) Notice: Subject to any disclaimer, the term of this patent is extended or adjusted under 35 U.S.C. 154(b) by 980 days.

(21) Appl. No.: 12/451,839

(22) PCT Filed: Jun. 12, 2008

(86) PCT No.: PCT/EP2008/057359
§ 371 (c)(1),
(2), (4) Date: Dec. 3, 2009

(87) PCT Pub. No.: WO2009/003817
PCT Pub. Date: Jan. 8, 2009

(65) Prior Publication Data
US 2010/0101755 A1    Apr. 29, 2010

(30) Foreign Application Priority Data

Jul. 4, 2007  (IT) .............................. MN2007A0029

(51) Int. Cl.
*F22B 15/00*    (2006.01)
(52) U.S. Cl.
USPC ................... 122/235.22; 122/235.11; 122/74
(58) Field of Classification Search
USPC ........... 122/15.1, 18.1, 31.1, 51, 53, 59, 44.1, 122/74, 110, 123, 235.11, 235.22, 235.23, 122/235.32
See application file for complete search history.

(56) References Cited

U.S. PATENT DOCUMENTS

| | | | | |
|---|---|---|---|---|
| 460,347 A * | 9/1891 | Baird | | 122/53 |
| 460,906 A * | 10/1891 | Baird | | 122/53 |
| 2,055,949 A * | 9/1936 | Sharp | | 122/33 |
| 2,888,910 A * | 6/1959 | Loebel | | 122/149 |
| 4,372,255 A * | 2/1983 | Hung | | 122/149 |
| 4,546,827 A * | 10/1985 | Wachendorfer, Sr. | | 165/165 |
| 6,427,638 B1 * | 8/2002 | Kolbusz et al. | | 122/15.1 |
| 6,564,756 B1 * | 5/2003 | Rayes | | 122/149 |
| 7,523,721 B2 * | 4/2009 | Hamada et al. | | 122/31.1 |
| 7,958,852 B2 * | 6/2011 | Kim | | 122/1 B |
| 2011/0132280 A1 * | 6/2011 | Habib et al. | | 122/51 |

FOREIGN PATENT DOCUMENTS

| | | |
|---|---|---|
| EP | 0 373 027 A | 6/1990 |
| EP | 0 618 410 A | 10/1994 |
| EP | 0 687 870 A | 12/1995 |
| EP | 1 243 866 A | 9/2002 |
| GB | 2 285 117 A | 6/1995 |
| WO | WO 2006/097959 A | 9/2006 |

* cited by examiner

*Primary Examiner* — Gregory A Wilson
(74) *Attorney, Agent, or Firm* — Modiano & Associati; Albert Josif; Daniel J. O'Byrne

(57) ABSTRACT

A heat exchanger for a boiler, comprising, within a monolithic structure, at least one pair of mutually opposite manifolds connected by perforated pins inserted within a portion of space which is delimited by the structure and is designed to convey the products of combustion, the manifolds being adapted to provide the circulation of the fluid to be heated between an inlet connector and an outlet connector.

3 Claims, 4 Drawing Sheets

HEAT EXCHANGER FOR A BOILER

BACKGROUND OF THE INVENTION

Heat exchangers are known which are adopted in boilers designed to heat a fluid, very commonly constituted by water or diathermic oil, which comprise, within a monolithic structure often made of aluminum, two opposite plates which have a variously shaped interspace for the conveyance of the fluid to be heated and are provided with pins which are inserted in a portion of space which is designed to convey the products of combustion, so as to receive heat which is transmitted to said fluid by means of the base of said pins.

In the particular case in which such exchangers are adopted in gas-fired condensing boilers, they have a burner which is located at the upper head, and the products of combustion are conveyed into a portion of space which extends from said head to the bottom of the exchanger, where there is a duct for evacuation to the stack.

The described heat exchangers are very widespread but have some disadvantageous characteristics. For example in the upper portion of the exchanger, close to the flame, short pins have to be used, to avoid burning them.

SUMMARY OF THE INVENTION

The aim of the invention is to provide an improved heat exchanger for boiler.

This aim is achieved by a heat exchanger for a boiler, according to the invention, characterized in that it comprises, within a monolithic structure, at least one pair of mutually opposite manifolds connected by perforated pins inserted within a portion of space which is delimited by said structure and is designed to convey the products of combustion, said manifolds being adapted to provide the circulation of the fluid to be heated between an inlet connector and an outlet connector.

BRIEF DESCRIPTION OF THE DRAWINGS

Further characteristics and advantages of the heat exchanger will become better apparent from the description of a preferred but not exclusive embodiment of the heat exchanger according to the invention, illustrated by way of non-limiting example in the accompanying drawings, wherein.

DESCRIPTION OF THE PREFERRED EMBODIMENTS

Figure 1:
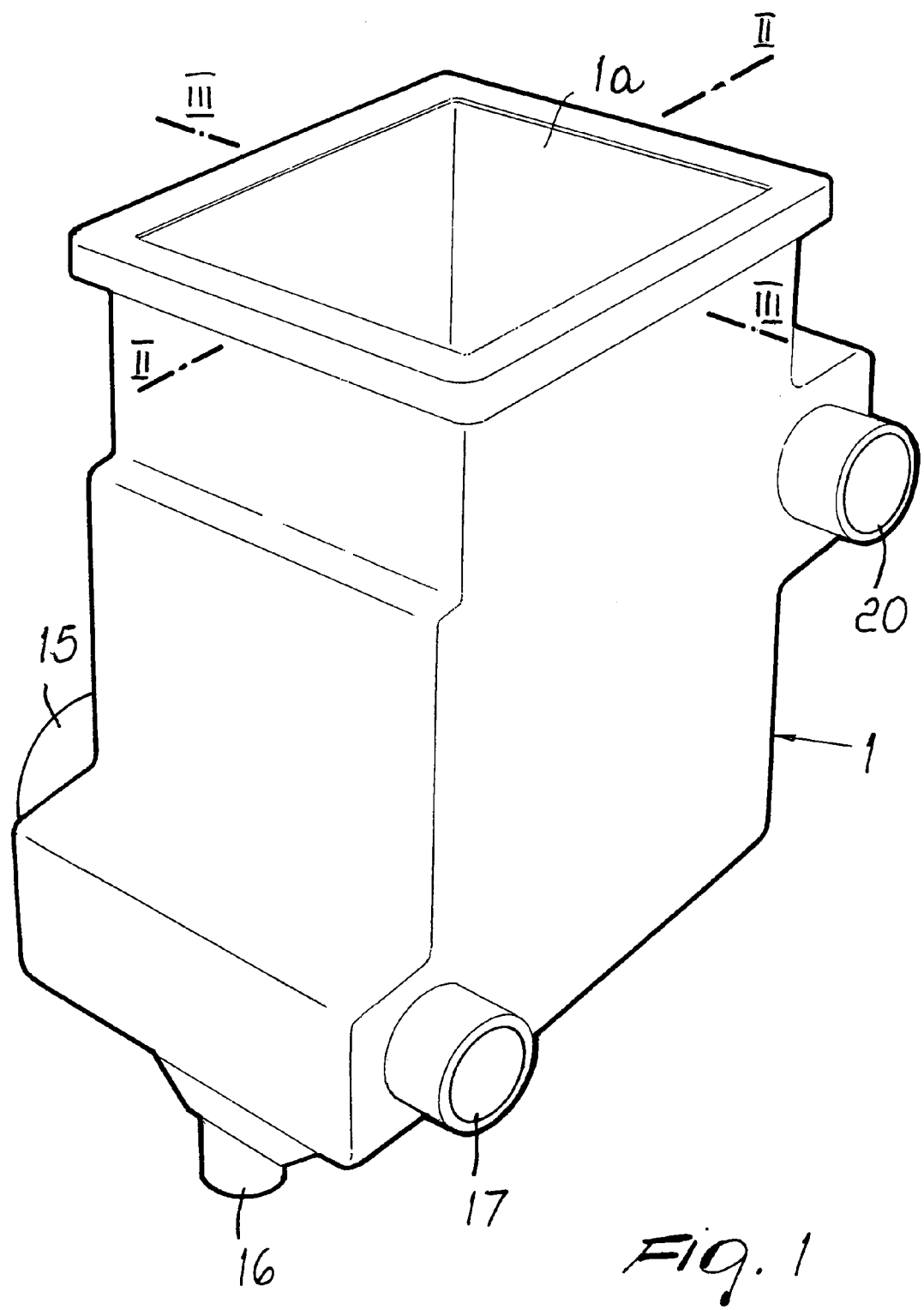
FIG. 1 is a perspective view of the heat exchanger according to the invention.

With reference to the figures, the reference numeral 1 generally designates a heat exchanger according to the invention, adopted in a gas-fired condensing boiler, which comprises, within a monolithic structure, at least one and preferably three pairs of mutually opposite manifolds designed to contain the fluid to be heated, assumingly water: the first pair is formed by manifolds 2 and 3, the second pair is formed by manifolds 4 and 5, and the third pair is formed by manifolds 6 and 7.

Such manifolds are connected by perforated pins 8 and 9 for the first pair, 10 and 11 for the second pair, 12 and 13 for the third pair, and said perforated pins are inserted within a portion of space 14 designed to convey the products of the combustion generated in a burner, not shown in the figure, which is arranged at the upper edge of a head 1a designed for flame development, to a bottom 1b provided with a duct 15 for evacuation to the stack and with a connector 16 for the discharge of condensation according to the arrow C.

Figure 3:
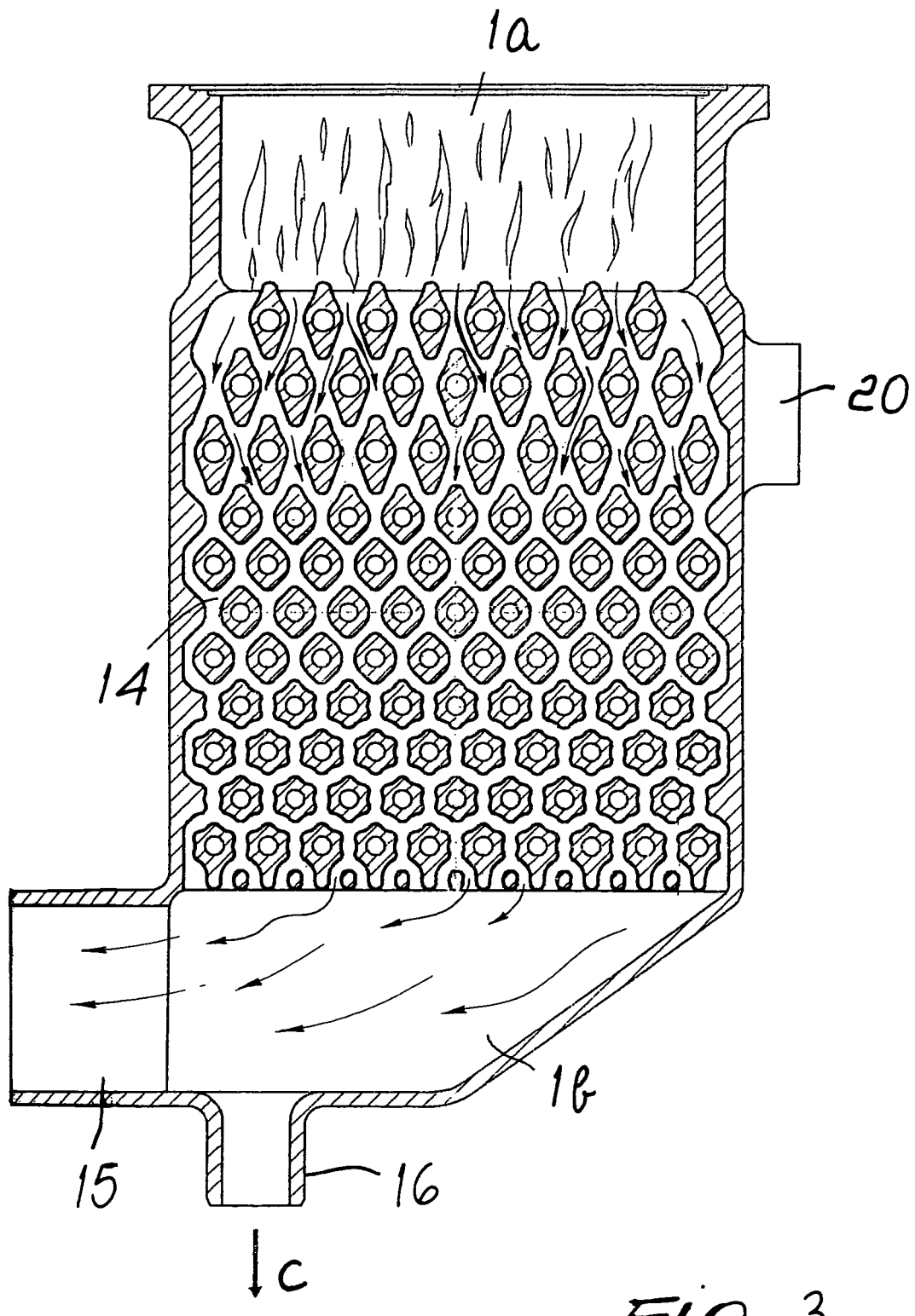
FIG. 3 is a sectional view, taken along the line III-III of FIG. 1.
Figure 4:
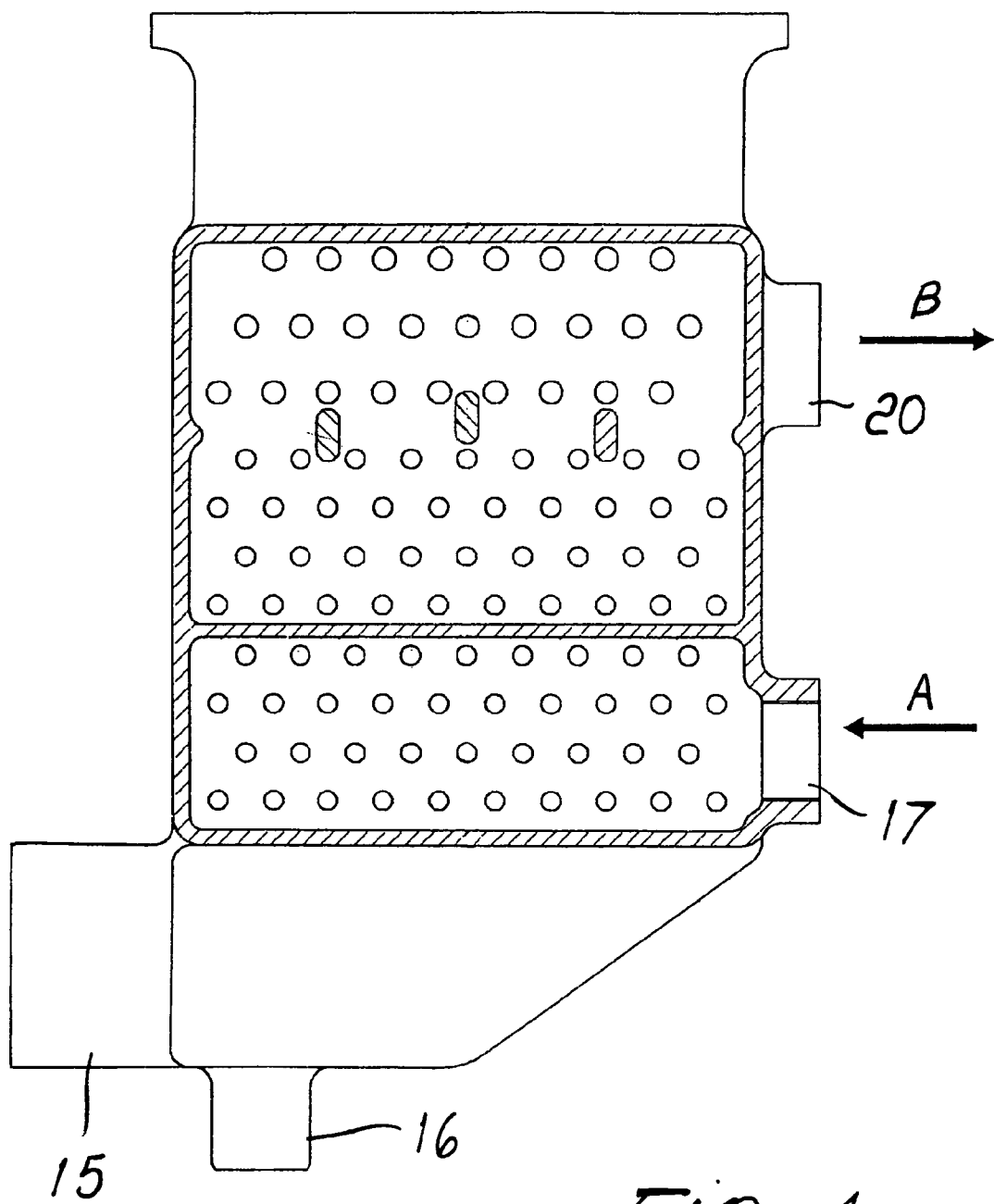
FIG. 4 is a sectional view, taken along the broken line IV-IV of FIG. 2.

Reverting to FIG. 3, the perforated pins are contoured at the outer surface so as to provide differentiated conditions of motion of the products of combustion that skims said surface as shown by the arrows; it is thus possible to pass advantageously from a laminar motion at the inlet, to a turbulent motion at the outlet, with a high exchange of heat between the products of combustion and the water conveyed by the perforated pins.

Figure 2:
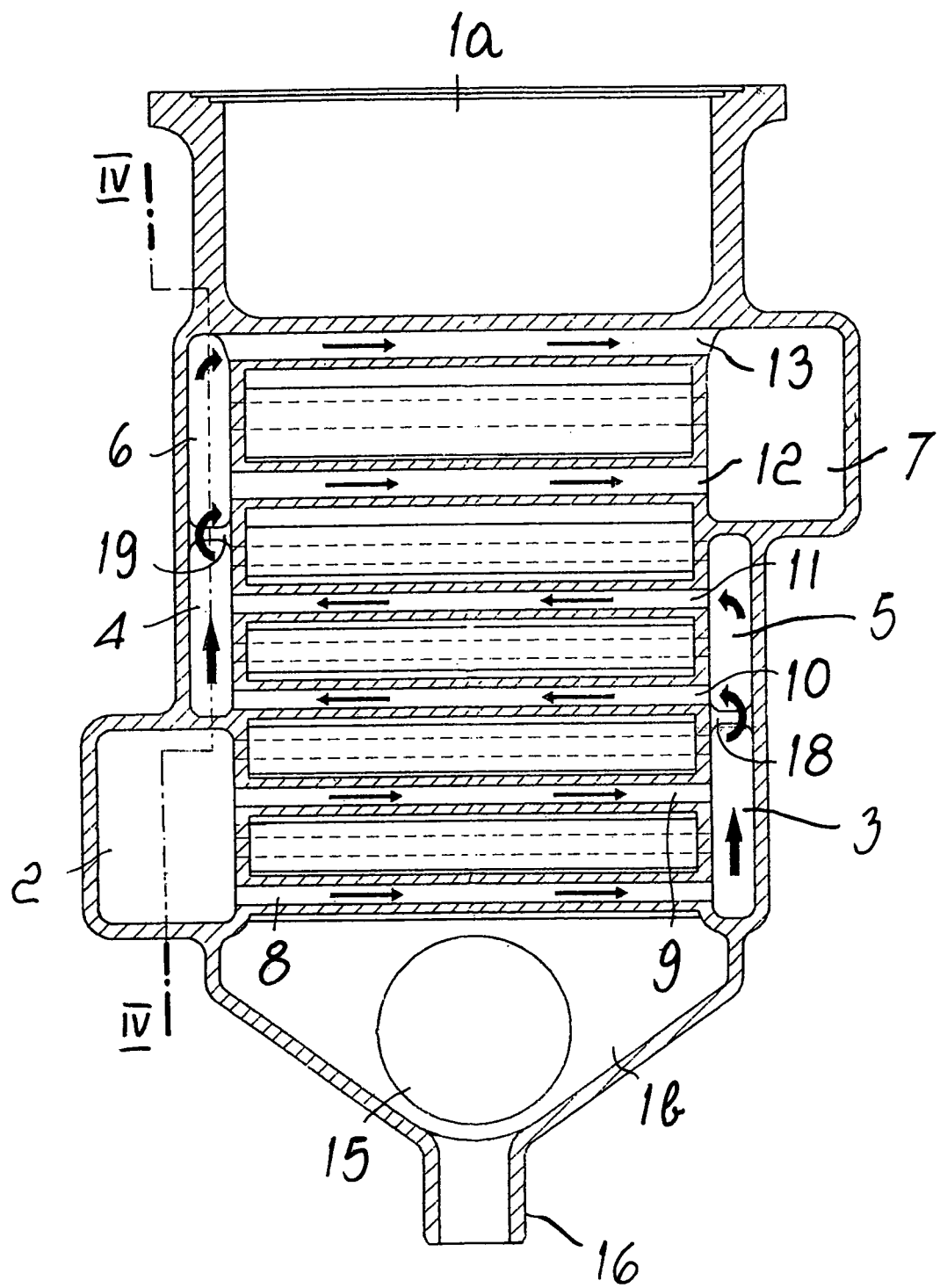
FIG. 2 is a sectional view, taken along the line II-II of FIG. 1.

The circulation of the water within the exchanger is shown clearly in particular in FIG. 2.

Once the water has entered along the arrow A through a connector 17 provided on the manifold 2, it is conveyed to the manifold 3 by means of the perforated pins 8 and 9, passes to the manifold 5 through ports 18, is conveyed to the manifold 4 by way of the perforated pins 10 and 11, passes to the manifold 6 through ports 19, and finally is conveyed to the manifold 7 by way of the perforated pins 12 and 13, to exit through a connector 20 provided on said manifold, according to the arrow B.

The heat exchanger according to the invention provides considerable advantageous features.

It should be noted first of all that the surface temperature of the pins in contact with the products of combustion is close to the temperature of the water that passes through them, and the consequent great temperature variation provides considerable benefits to the conditions of the heat exchange between such fluids.

Moreover, in the upper part of the heat exchanger, close to the flame, it is possible to adopt long pins, differently from what occurs in the background art, without running the risk of burning them, and it is also important to consider that in the lower part of the heat exchanger the temperature of the pins is substantially the same as the temperature of the incoming water, thus providing a large cold surface which facilitates considerably the condensation of the water vapor that is present in the products of combustion.

The described invention is susceptible of numerous modifications and variations, all of which are within the scope of the appended claims; all the details may further be replaced with other technically equivalent elements.

The disclosures in Italian Patent Application no. MN2007A000029, from which this application claims priority, are incorporated herein by reference.

The invention claimed is:

1. A heat exchanger for a gas-fired condensing boiler, comprising, within a monolithic structure, a plurality of pairs of mutually opposite manifolds each connected respectively by a plurality of perforated pins inserted within a portion of space which is delimited by said structure and is designed to convey the products of combustion, said manifolds being adapted to provide the circulation of the fluid to be heated between an inlet connector and an outlet connector, said products of combustion being conveyed within said portion of space between a head of the heat exchanger, for location of a burner, and an evacuation duct located proximate to a bottom of the heat exchanger;

said plurality of pairs of straight manifolds being arranged so as to be adjacent at two mutually opposite faces of the monolithic structure, one of the manifolds of the pairs provided proximate to a head and proximate to a bottom of the exchanger being provided with a connector respectively for the outflow and inflow of the fluid to be heated, each of the remaining manifolds being provided with ports for connection to the adjacent manifold.

2. The heat exchanger according to claim 1, wherein the perforated pins are contoured at an outer surface so as to provide different conditions of motion of the products of combustion that skim said surface.

3. The heat exchanger according to claim 1, wherein the perforated pins are contoured at an outer surface so as to provide different conditions of motion of the products of combustion that skim said surface, passing from laminar motion in input to turbulent motion in output.

* * * * *